Jan. 27, 1925.
E. E. GRADY
PACKER
Filed March 15, 1924
1,524,431
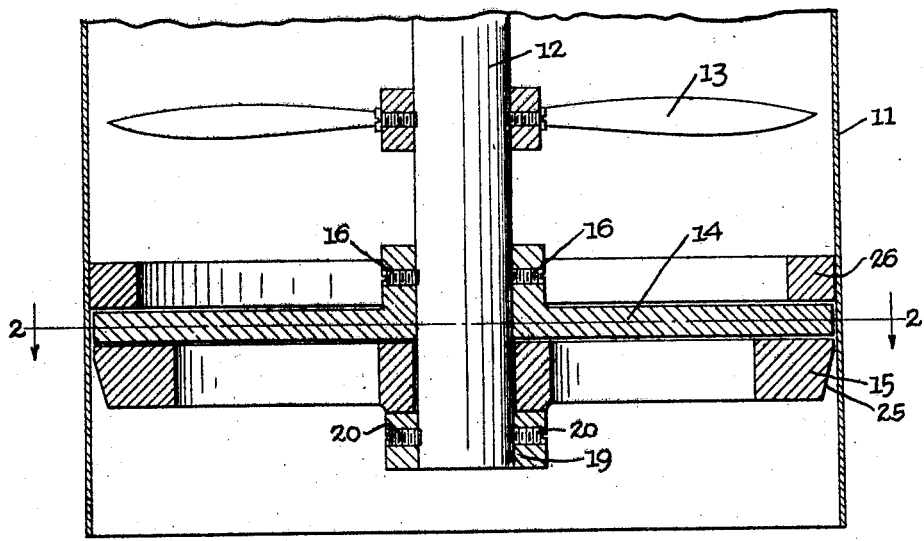
Fig. 1
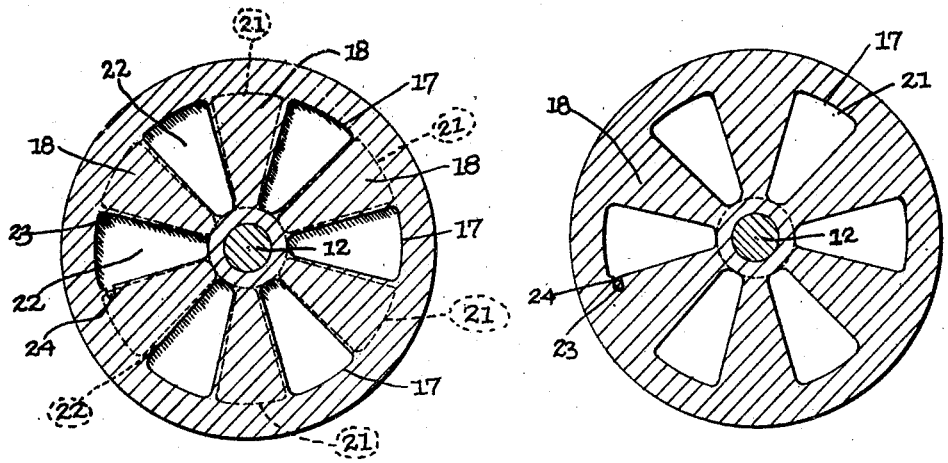
Fig. 2
Fig. 3
Edwin E. Grady
Inventor
by
Attorneys Patented Jan. 27, 1925.

1,524,431

UNITED STATES PATENT OFFICE.

EDWIN E. GRADY, OF CLEVELAND, OHIO.

PACKER.

Application filed March 15, 1924. Serial No. 699,544.

*To all whom it may concern:*

Be it known that I, EDWIN E. GRADY, a citizen of the United States of America, and a resident of Cleveland, in the county of Cuyahoga and State of Ohio, have invented certain new and useful Improvements in Packers, of which the following is a full, clear, and exact description.

In the packaging of material such as flour it is customary to utilize a packer which comprises a long tube about which the package is placed and within which is an impelling means usually in the form of a rotating screw or propeller arranged to force the material into the package and in addition to hold the material when the impeller ceases operation. Various attempts have been made to utilize such machines for packaging materials such as sand but it has been found that while the machine would properly feed the material into the package the impelling means was ineffective to stop the flow of the material. My invention is designed to overcome this defect by providing means for preventing the flow of the material when the impelling means ceases operation. In the drawings accompanying this specification and forming a part thereof I have shown, for purposes of illustration, one form which my invention may assume. In these drawings:

Figure 1 represents a vertical section through the tube showing this illustrative embodiment of my invention, Figure 2 is a section on the line 2—2 of Figure 3, while Figure 3 is a section similar to Figure 2 but showing the parts arranged to permit passage of the material.

In the embodiment of my invention herein shown I have utilized the usual tube 11, impeller shaft 12, and impellers 13, and have secured to the impeller shaft 12 a pair of disks 14 and 15 arranged to accomplish the object of my invention.

The disk 14 is fixed to the shaft 12 for rotation therewith by means of a pair of set screws 16 and is provided with a plurality of apertures 17 separated by solid portions 18. The disk 15 is loosely mounted upon the shaft 12 between the disk 14 and a collar 19 secured to the shaft 12 by means of suitable set screws 20 and the disk 15 is provided with a plurality of apertures 21 each of slightly less extent than the corresponding solid portion 18 of the disk 14 and accordingly separated by solid portions 22 each of slightly greater extent than the apertures 17 of the disk 14. Positioned on the disk 15 and extending into one of the apertures 17 of the disk 14 is a pin 23 effective to cause the disk 15 to rotate with the disk 14 except for the lost motion permitted by the play of the pin 23 within the aperture 17 and an extension 24 thereof which is formed of such width that the lost motion between the two disks is sufficient to change their relative position from that shown in Figure 2 in which the solid portions of one disk exactly close the apertures in the other disk and that shown in Figure 3 in which the apertures are aligned to permit the passage of material therethrough.

It will be obvious from the above description that with the disks in the position shown in Figure 2 and with the impeller shaft 12 stationary the disks will prevent passage of the material from the tube 11, that rotation of the impeller shaft 12 will immediately rotate the disk 14 but will not rotate the disk 15 until the pin 23 has completed its travel across the aperture 17 and extension 24, that this lag in the rotation of the disk 15 will bring the apertures of the two disks into alignment, that the disks will maintain this relative position until rotation of the shaft 12 is terminated, that stoppage of the shaft 12 will stop the disk 14 immediately but permit the disk 15 to rotate under its own inertia until the pin 23 has traversed the extension 24 and aperture 17 in the reverse direction, that in this position the apertures of one disk will be opposed to the solid portions of the other to prevent material passing from the tube 11, and that the disks will remain in this relative position until the shaft 12 is again actuated.

In order to increase the certainty of action of the disk 15 I prefer to form the disk 15 of considerable thickness as herein shown and then to prevent the liklihood of material wedging between the disk 15 and the tube 11 I prefer to bevel the edge of the disk 15 as shown at 25 and to prevent the liklihood of any material passing between the disks and tube 11 I prefer to secure to the tube 11 a ring 26 overlying the periphery of the disk 14. In order to further increase the certainty of action of the disk 15 I prefer to provide brake means (not shown) arranged to act upon the shaft 12 when the power is disconnected from the shaft 12 so that the rotation of the shaft 12 will cease abruptly. This brake means may be of any suitable type such as a band encircling a drum on the shaft 12 and tensioned by the mechanism operating the clutch connecting the shaft 12 to its driving means.

It will be obvious to those skilled in the art that the particular embodiment of my invention herein described and shown may be variously modified without departing from the spirit of my invention or sacrificing the advantages thereof and it will therefore be understood that the disclosure herein is illustrative only and that my invention is not limited thereto.

I claim:

1. A packer comprising a tube, impeller means therein, a first disk positioned within said tube and carried by said impeller means to rotate therewith and provided with apertures to permit the passage of material therethrough, a second disk abutting said first disk and provided with apertures arranged to be in alignment with the apertures of said first disk in one relative position of said disks and out of alignment in another relative position of said disks, and means arranged to cause said second disk to rotate with said first disk except for a lost motion effective to shift said disks between one such relative position and the other such relative position.

2. A packer comprising a tube, material impelling means mounted within said tube, and a plurality of relatively movable disks positioned within said tube and arranged to rotate with said impelling means except for a lost motion movement relative to each other and effective to shift said disks between a relative position in which they are effective to close said tube and a relative position in which said tube is open.

3. A packer comprising a tube, impeller means therein, a first disk positioned within said tube and carried by said impeller means to rotate therewith and provided with apertures to permit the passage of material therethrough, and a second disk abutting said first disk and rotatable independently thereof and provided with apertures arranged to be in alignment with the apertures of said first disk in one relative position of said disks and out of alignment in another relative position of said disks.

4. A packer comprising a tube, material impelling means mounted within said tube, and gate means mounted within said tube and comprising a plurality of members mounted to rotate with said impelling means except for a lost motion movement relative to each other effective to shift said members between a relative position in which they are effective to close said tube and a relative position in which said tube is open.

5. A packer comprising a tube, a first disk rotatably positioned therein and provided with apertures arranged to permit the passage of material therethrough, a second disk abutting said first disk and provided with apertures arranged to be in alignment with the apertures of said first disk in one relative position of said disks and out of alignment therewith in another relative position of said disks, and means arranged to cause said disks to rotate in unison except for a lost motion effective to shift said disks between one such relative position and the other such relative position.

6. A packer comprising a tube, material impelling means mounted within said tube, and a plurality of relatively movable disks positioned within said tube and arranged to shift relative to each other to open said tube as said impelling means begins operation and to close said tube as said impelling means ceases operation.

7. A packer comprising a tube, a first disk rotatably positioned therein and provided with apertures adapted to permit the passage of material therethrough, and a second disk abutting said first disk and rotatable independently thereof and provided with apertures arranged to be in alignment with the apertures of said first disk in one relative position of said disks and out of alignment in another relative position of said disks.

8. A packer comprising a tube, material impelling means mounted within said tube, and gate means arranged to open said tube as said impelling means begins operation and to close said tube as said impelling means ceases operation.

In testimony whereof, I hereunto affix my signature.

EDWIN E. GRADY.